United States Patent [19]

Clements

[11] Patent Number: 5,692,402
[45] Date of Patent: Dec. 2, 1997

[54] VEHICLE SECURITY DEVICE

[76] Inventor: Craig C. Clements, 503-32 Grenville Street, Toronto, Ontario, Canada, M4Y 1A3

[21] Appl. No.: 646,086

[22] Filed: May 7, 1996

[51] Int. Cl.⁶ ....................................... B62H 5/16
[52] U.S. Cl. ................... 70/234; 70/18; 70/225; 70/237; 248/500; 248/551; 414/401
[58] Field of Search .................. 70/18, 233, 237, 70/225, 234–236, 226, 253; 248/500, 551, 507, 508, 680; 414/396, 401, 584

[56] References Cited

U.S. PATENT DOCUMENTS

| | | | |
|---|---|---|---|
| 1,202,444 | 10/1916 | Soleau | 70/234 |
| 1,351,297 | 8/1920 | McCracken. | |
| 1,809,003 | 6/1931 | Van Horst | 70/233 X |
| 2,280,936 | 4/1942 | Swanson | 301/2.5 |
| 3,785,500 | 1/1974 | Kennelly | 70/235 X |
| 3,918,279 | 11/1975 | Williamson | 70/234 |
| 4,126,228 | 11/1978 | Bala et al. | 70/234 X |
| 4,312,452 | 1/1982 | Waier | 70/237 X |
| 4,488,417 | 12/1984 | Werner | 70/253 |
| 5,562,177 | 10/1996 | Chacon | 70/237 X |

FOREIGN PATENT DOCUMENTS

| | | | |
|---|---|---|---|
| 1264699 | 1/1990 | Canada | 70/12 |
| 2052021 | 3/1992 | Canada. | |
| 2129000 | 8/1993 | Canada. | |
| 2070881 | 10/1993 | Canada. | |

*Primary Examiner*—Lloyd A. Gall
*Attorney, Agent, or Firm*—Duft, Graziano & Forest, P.C.

[57] ABSTRACT

A security device for a vehicle. The security device comprises a housing having first and second rods with the ends thereof extending from opposed sides of the housing. One end of the first rod fits over an axle of the vehicle and the corresponding end of the second rod extending under the axle and through an eyelet located in the first rod. Each of the rods is movable longitudinally and rotatably with respect to the housing. The opposed ends of the first and second rods are releasably anchorable. The security device is usable with a variety of vehicles, and is particular intended for use on car lots e.g. automobile dealerships.

14 Claims, 2 Drawing Sheets

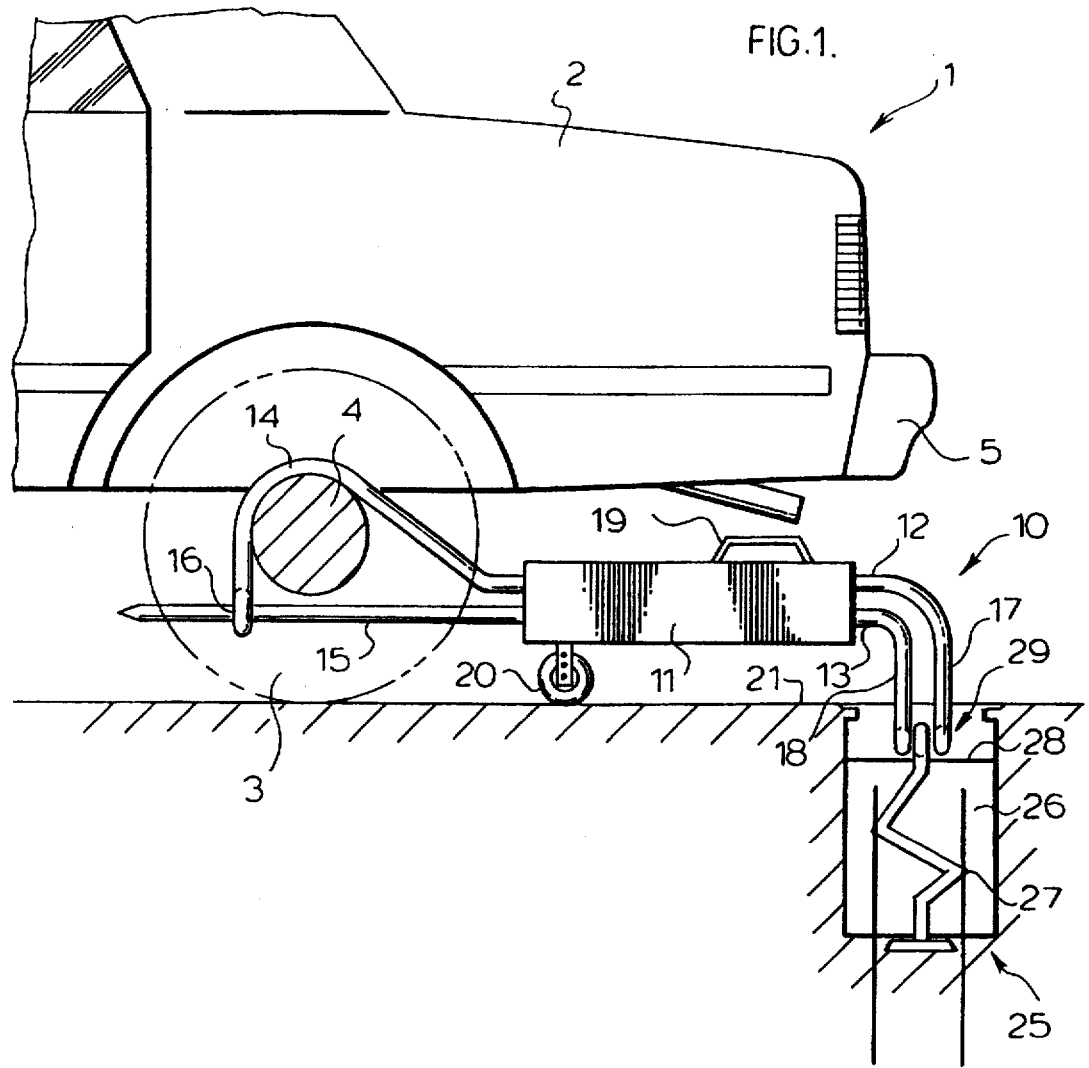

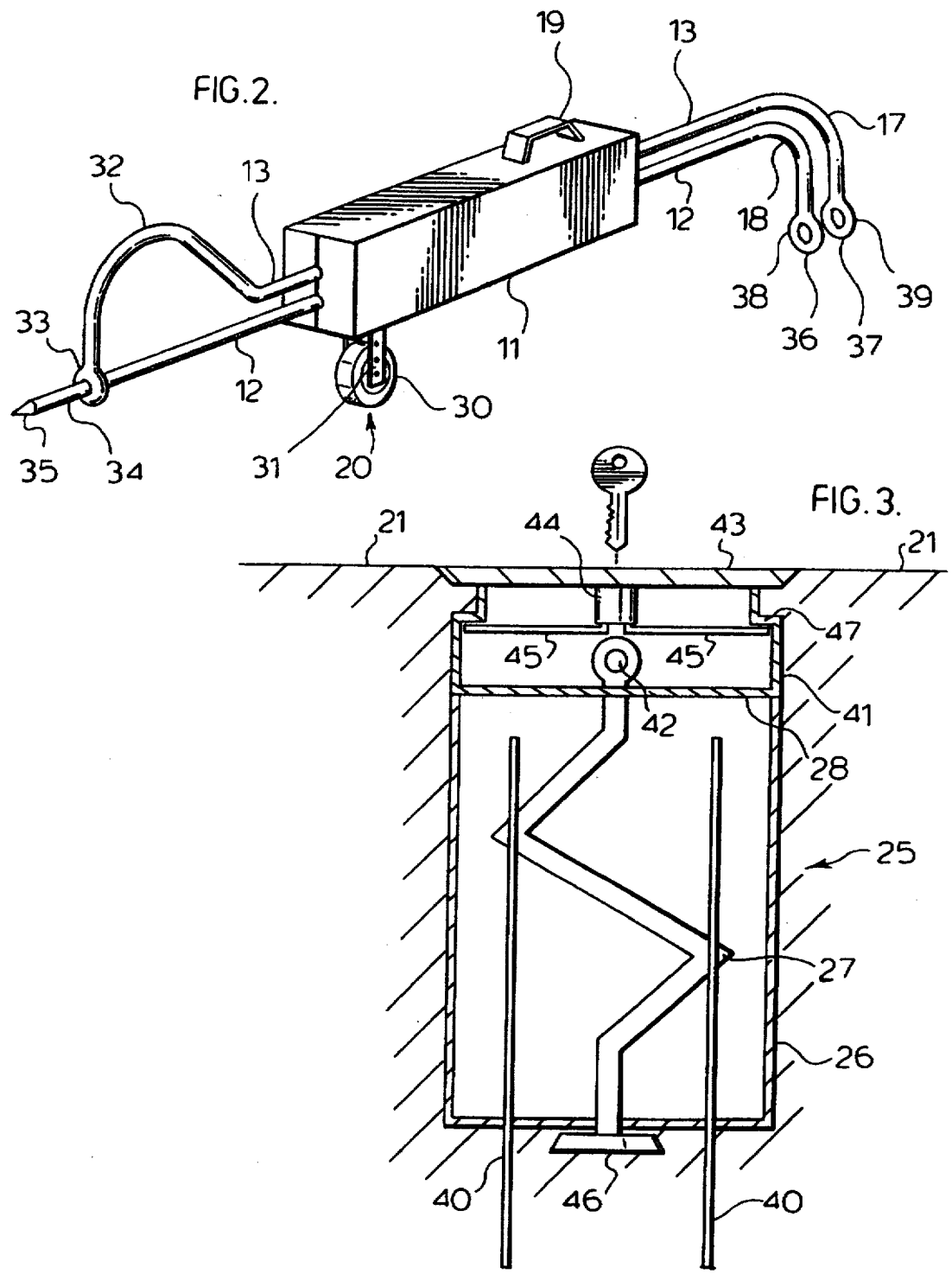

VEHICLE SECURITY DEVICE

FIELD OF THE INVENTION

The present invention relates to a security device for a vehicle, and especially to a security device to anchor a vehicle to the ground, so as to prevent movement of the vehicle and/or to render theft of the vehicle more difficult.

BACKGROUND TO THE INVENTION

The theft of vehicles is becoming of increasing concern, both to individual owners of vehicles as well as owners of large numbers of vehicles that are stored in one location. The latter include, for instance, both owners of fleets of vehicles and owners of automobile sales locations.

Even though a vehicle may be locked, and additionally have electronic or mechanical features incorporated into the vehicle or attached e.g. to a steering wheel, theft of the vehicle can still occur. For instance, it is possible for codes used in electronic devices to be obtained by persons disposed towards theft of vehicles. It is understood that it is a practice of automobile manufacturers to make changes to the codes that are used in electronic anti-theft devices, to try to thwart thieves and prevent theft of vehicles. In addition, electronic anti-theft devices can be "hot-wired" and vehicles equipped with such devices are relatively easy to steal. Alternatively, persons wishing to steal an automobile may be able to tow the vehicle away from its parked location, either with a regular tow truck or by lifting the vehicle and placing it on a flat bed truck.

The problems of automobile theft are of increasing concern, to the extent that owners of locations having significant numbers of automobiles are facing ever increasing costs for insurance or are being required to install other security devices e.g. fences, to prevent theft of their vehicles. This also prevents access to the vehicles by legitimate potential customers, if it is a sales location, and detracts from the beauty of the sales or other location.

Any security device that is to be attached to an automobile must be readily installed, otherwise there is a tendency for users of this security device to neglect to install the device because of the time or difficulty of installation. Electronic or other non-removable devices add to the cost of the vehicle, making the automobile dealer less competitive.

Improvements in or alternative security devices are required to reduce incidents of theft.

SUMMARY OF THE INVENTION

A security device has now been found which is both readily installed and which will anchor the vehicle to the ground to make theft more difficult.

Accordingly the present invention provides a security device for a vehicle comprising:

a housing having first and second rods, each of said rods having ends extending from opposed sides of said housing, one end of the first rod fitting over an axle of the vehicle and the corresponding end of the second rod extending under said axle and through an eyelet located in the first rod, each of said rods being movable longitudinally and rotatably with respect to said housing, the opposed ends of the first and second rods being releasably anchorable, especially releasably attachable to an anchor.

In a preferred embodiment of the security device, the ends of the rods are releasably attachable to an anchor located below ground level.

Another aspect of the invention provides a security device for a vehicle comprising:

a) a housing having first and second rods with ends thereof extending from opposed sides of said housing, each of said rods being movable longitudinally and rotatably with respect to said housing;

b) said first rod having a linear section intermediate between said first and second ends, said linear section of the first rod extending in an arcuate shape to fit over an axle of said vehicle, said second end of the first rod extending away from said linear section substantially at right angles thereto;

c) said second rod having a linear section intermediate between said first and second ends, said linear section of the second rod extending linearly to said first end, said second end of the second rod extending away from said linear section substantially at right angles thereto, said first end of the second rod being adapted to pass through an eyelet on said first end of the first rod and extend therebeyond; and d) said second ends being capable of being attached to an anchor, especially to a permanently-secured anchor, particularly an anchor secured in the ground.

In a preferred embodiment, the anchor is located below ground level.

A further aspect of the present invention provides a method of securing a vehicle, comprising:

(a) installing a first rod over an axle of the vehicle;

(b) passing a second rod under the axle and through an eyelet in the first rod; and (c) attaching each of the first and second rods to an anchor located below ground level.

In a preferred embodiment of the method, the first rod has a curved end and such rod is rotated in one direction and then in the opposed direction so as to install said rod over the axle of the vehicle.

In a further embodiment, in step (c), the ends of the rod Opposed to the location of the axle of the vehicle are attached to an anchor.

BRIEF DESCRIPTION OF THE DRAWINGS

The present invention is illustrated by the embodiments shown in the drawings in which:

FIG. 1 is a schematic representation partially in section of an automobile with a security device attached thereto;

FIG. 2 is a schematic representation of the security device of FIG. 1 detached from the vehicle; and FIG. 3 is a schematic representation of an anchor used with the security device.

DETAILED DESCRIPTION OF THE INVENTION

FIG. 1 shows an automobile 1 having an automobile body 2 with rear wheel 3. Rear wheel 3 is shown in section. Rear wheel 3 has axle and rear bumper 5 attached thereto. A security device, generally indicated by 10, is located beneath automobile 1, extending forwards from approximately the location of rear bumper 5 and being attached about axle 4.

Security device 10 has housing 11 through which first rod 12 and second rod 13 extend. Each of first rod 12 and second rod 13 is movable longitudinally within housing 11. In addition, both first rod 12 and second rod 13 are rotatable with respect to housing 11.

First rod 12 has curved end 14 that is shown as curving over axle 4 to a location approximating the lower surface of axle 4. Curved end 14 has eyelet 16 in the end thereof; while the eyelet is generally described herein as being on or in the end of first rod 12, it may be spaced from the tip of such rod. Second rod 13 extends from housing 11 under axle 4, forming linear end 15 that passes through eyelet 16 of first rod 12 and extends beyond said eyelet 16. Linear end 15 is preferably pointed so that it may be more readily passed through eyelet 16. It is understood that eyelet 16 may be in the form of an eyelet in first rod 12, or alternatively a ring or other orifice through which second rod 13 may be passed as described herein. For convenience, such eyelets, rings or other orifices are referred to herein as eyelets.

At the other end of housing 11, first rod 12 and second rod 13 extend away from housing 11, and then bend at substantially right angles to form first rod end 17 and second rod end 18. Each of said rod ends extends downwards, which is opposed to the orientation of curved end 14.

In the preferred embodiment of the present invention, first rod 12 and second rod 13 are coplanar, or substantially so, throughout the lengths thereof.

It is understood that first rod 12 is rotatable within housing 11 through an angle of at least about 90°, such that first rod end 17 of first rod 12 can be moved from the position shown in FIG. 1 to a location above the level of the ground, indicated by 21, for ease of installation. Similarly second rod 13 is rotatable through at least about 90°. Rotation of first rod end 17 of first rod 12 results in rotation of rod end 14 so that it may be passed over the axial 4 of the vehicle. It will be understood that first rod 12 would be shaped accordingly.

It is understood that first rod 12 and second rod 13 would need to be cooperatively shaped, especially in the region of first rod end 17 and second rod end 18, so that the rods may be installed and so that such ends may be locked together as described herein.

Housing 11 has wheel 20, for ease of movement of housing 11. In addition, housing 11 is shown as having handle 19, also for ease of movement of housing 11. In preferred embodiments, wheel 20 is an adjustable wheel, permitting raising or lowering of housing 11 to accommodate different types of automobiles i.e. axles of different heights above ground level.

In the embodiment shown, which is preferred, an anchor, generally indicated by 25, is located below ground level. Such an anchor would normally be permanently located below ground, but other anchors could be used. Anchor 25 has plug 26 located therein. Anchor rod 27 extends into plug 26, with its upper end extending above plug surface 28. Anchor rod 27 is shown as having a non-linear shape. It is understood that anchor rod 27 should not be linear, as a linear rod is relatively easily pulled from plug 26. However, it is not necessary that anchor rod 27 have the shape shown in FIG. 1, as a variety of non-linear shapes, especially substantially non-linear shapes may be used. First rod end 17 and second rod end 18 are connected to anchor rod 27 at rod lock 29, shown in more detail below.

FIG. 2 shows housing 11 having wheel 20 thereon, as support for housing 11, and hence for security device 10. Wheel 20 of housing 11 has tire 30 attached to brace 31. As is indicated on the drawing, wheel 20 may be located at different positions on brace 31, for the purpose of changing the elevation of housing 11 to more readily accomodate use with different types of automobiles.

Rod 13 is shown as extending from housing 11 to form a curved end in the form of hook 32 that terminates in hook end 33. As shown in FIG. 2, hook 32 is falcate, which is a convenient shape but it is to be understood that other shapes may be used. The shape of hook 32 is intended such that first rod 12 may fit over axle 4 of a vehicle, as shown in FIG. 1. In addition, hook 32 extends downwardly, for instance on the front side of a rear axle on a vehicle, to terminate at hook end 33. Hook end 33 is in the form of an eyelet, of a size to accommodate second rod 13. Second rod 13 is shown as passing through hook end (eyelet) 33, extending therefrom at rod extension 34 and terminating at second rod end 35. Second rod 13 should extend sufficiently beyond hook end 33 that hook 32 cannot be bent by application of force thereto to an extent sufficient to remove hook end 33 from second rod end 35, and thus remove the security device from the vehicle by force.

At the opposed end of housing 11, first rod 12 and second rod 13 extend therefrom towards first rod end 17 and second rod end 18. Each of first rod 12 and second rod 13 is shown as being curved at substantially right angles in a downward direction, terminating in tip ends 36 and 37. Tip end 36 is shown as having orifice (eyelet) 38 therein, and correspondingly tip end 37 is shown as having orifice (eyelet) 39 therein. Orifices (eyelets) 38 and 39 are in an aligned position.

FIG. 3 shows anchor lock 25 having plug 26 located below ground level 21. In the embodiment shown, plug 26 has two frost rerods 40 extending from plug 26 downward into the earth below the plug. In cold climates such frost rerods are important to stop heaving of the plug during thaw and freezing cycles. In warmer climates, frost rerods 40 should not be needed.

Anchor rod 27 is shown as extending in a nonlinear fashion throughout the entire length of plug 26. Beneath plug 26, anchor rod 27 terminates in anchor rod base plate 46, to make it more difficult to remove anchor rod 27 from plug 26. At its upper end, anchor rod 27 extends beyond plug 26, into casing 41 and terminates with anchor rod eyelet 42. Casing 41 extends around the cavity formed at the upper section of plug 26 and provides support for both ground plate 43 and, as shown in FIG. 3, keyed lock 44. In the embodiment Shown, keyed lock 44, which is optional but preferred, has lock tie rod 45 that extends across the width of casing 41 and locks under lip 47, which is part of casing 41. Such lock 44 on ground plate 43 makes it difficult for persons to reach the locking mechanism underneath, as well as providing protection for persons walking across the ground e.g. by preventing them from tripping or falling into the cavity formed by casing 41. Tip ends 36 and 37 of first rod 12 and second rod 13 are not shown in FIG. 3, but would be attached to anchor rod eyelet 42.

The length of the rods varies with the type of vehicle, although the same security device may be used on many vehicles. For instance, as an example, a 1995 Dodge Caravan would need a lower rod of at least about 54 inches, with a total overall length of about 50 inches. Similarly, the upper rod would be approximately the same length, but with an overall length of only about 43 inches.

The rods, housing and the like would be fabricated from a hard material e.g. a hardened steel, that is difficult to cut or break.

The unit is easy to install and to remove from a vehicle. It is unobtrusive, as it is located beneath the vehicle, and does not pose a tripping hazard. Removal of the device without use of a key would normally require use of an acetylene torch or similar cutting device, which would have to be used underneath the gas tank of the vehicle.

The security device described herein may be used in a wide variety of ways. For instance, the device is particularly intended for use in parking lots, especially in automobile dealerships to secure new cars prior to sale. This could enable the dealership to remove security fences, and allow potential customers to browse around cars at their convenience. It will also make the cars more secure, and less vulnerable to theft, which should result in reduced insurance costs and less likelihood of irate customers.

In other end-uses, the security device could be used in private driveways and garages, and in outdoor or underground parking lots. Companies could provide locations for their employees with the devices, as could shopping malls, restaurants, movie theatres, hockey rinks, airports, public parking lots and a wide variety of other businesses for their customers. Collectors of valuable automobiles could use the security devices as additional protection. Parking lots or other locations could also rent out the devices to customers, and obtain additional revenue. Parking meters could have the devices.

I claim:

1. A method of securing a vehicle, comprising:
    (a) installing a first rod over an axle of the vehicle;
    (b) longitudinally passing a second rod under the axle and through an eyelet in the first rod; and
    (c) attaching each of the first and second rods to an anchor located below ground level.

2. The method of claim 1 in which the first rod has a curved end and such rod is rotated in one direction and then in the opposed direction so as to install said rod over the axle of the vehicle.

3. The method of claim 2 in which, in step (c), ends of the rod opposed to the location of the axle of the vehicle are attached to an anchor.

4. A method of securing a vehicle using apparatus comprising:
    a housing having first and second rods, each of said rods having ends extending from opposed sides of said housing, each of said rods being movable longitudinally and rotatably with respect to said housing, the opposed ends of the first and second rods being releasably anchorable;
    said method comprising the steps of:
    (a) installing said first rod over an axle of said vehicle;
    (b) passing said second rod under said axle and through an eyelet in said first rod; and
    (c) attaching each of said first and second rods to an anchor located below ground level.

5. A security device for a vehicle comprising:
    a housing having first and second rods, each of said rods having ends extending from opposed sides of said housing, one end of the first rod adapted to fit over an axle of the vehicle and the corresponding end of the second rod adapted to extend under said axle and through an eyelet located in the first rod, each of said rods being movable longitudinally and rotatably with respect to said housing, the opposed ends of the first and second rods being releasably anchorable.

6. The security device of claim 5 in which said opposed ends of the first and second rods are releasably attachable to an anchor.

7. The security device of claim 6 in which the opposed ends of the rods are releasably attachable to an anchor located below ground level.

8. The security device of claim 6 in which said rods are steel rods.

9. A security device for a vehicle comprising:
    a) a housing having first and second rods with ends thereof extending from opposed sides of said housing, each of said rods being movable longitudinally and rotatably with respect to said housing;
    b) said first rod having a linear section intermediate between first and second ends, said linear section of the first rod extending in an arcuate shape to fit over an axle of said vehicle, said second end of the first rod extending away from said linear section substantially at a right angle thereto;
    c) said second rod having a linear section intermediate between first and second ends, said linear section of the second rod extending linearly to said first end, said second end of the second rod extending away from said linear section substantially at a right angle thereto, said first end of the second rod being adapted to pass through an eyelet on said first end of the first rod and extend therebeyond; and
    d) said second ends being capable of being attached to an anchor.

10. The security device of claim 9 in which said second ends are attachable to a permanently-secured anchor secured in the ground.

11. The security device of claim 10 in which the anchor is located below ground level.

12. The security device of claim 10 in which the rods are hardened steel rods.

13. The security device of claim 10 in which the anchor is permanently located below ground level.

14. The security device of claim 12 in which the anchor has a lock.

* * * * *